(12) United States Patent
Han et al.

(10) Patent No.: US 8,771,878 B2
(45) Date of Patent: Jul. 8, 2014

(54) POSITIVE ELECTRODE FOR RECHARGEABLE LITHIUM BATTERY, METHOD OF PREPARING THE SAME, AND RECHARGEABLE LITHIUM BATTERY INCLUDING THE SAME

(75) Inventors: Da-Woon Han, Yongin-si (KR); Kyeu-Yoon Sheem, Yongin-si (KR); Eui-Hwan Song, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 81 days.

(21) Appl. No.: 13/472,433

(22) Filed: May 15, 2012

(65) Prior Publication Data
US 2013/0029220 A1 Jan. 31, 2013

(30) Foreign Application Priority Data
Jul. 28, 2011 (KR) .................. 10-2011-0075228

(51) Int. Cl.
| | |
|---|---|
| H01M 4/60 | (2006.01) |
| H01M 4/62 | (2006.01) |
| H01M 4/64 | (2006.01) |
| H01M 4/583 | (2010.01) |

(52) U.S. Cl.
USPC ......... 429/231.8; 429/215; 429/232; 429/233

(58) Field of Classification Search
USPC ........... 429/303, 231.3, 212, 211, 215, 231.8, 429/232, 233; 427/77, 122
See application file for complete search history.

(56) References Cited

U.S. PATENT DOCUMENTS

| | | | | |
|---|---|---|---|---|
| 2005/0250014 | A1* | 11/2005 | Kumashiro et al. | 429/303 |
| 2006/0035150 | A1* | 2/2006 | Audemer et al. | 429/221 |
| 2006/0257745 | A1* | 11/2006 | Choi et al. | 429/231.3 |
| 2008/0038635 | A1* | 2/2008 | Sheem et al. | 429/212 |
| 2009/0142665 | A1 | 6/2009 | Sheem et al. | |
| 2010/0092868 | A1* | 4/2010 | Kim et al. | 429/231.8 |
| 2011/0171364 | A1* | 7/2011 | Xing et al. | 427/77 |
| 2011/0171371 | A1 | 7/2011 | Li et al. | |

FOREIGN PATENT DOCUMENTS

| | | |
|---|---|---|
| JP | 4452804 | 4/2010 |
| KR | 10-2002-0095273 A | 12/2002 |
| KR | 10-2003-0013553 A | 2/2003 |
| KR | 10-0681268 B1 | 2/2007 |
| KR | 10-2009-0053192 | 5/2009 |
| KR | 10-2010-0093953 A | 8/2010 |

OTHER PUBLICATIONS

"Electrical Properties of PVdF/PVP Composite Filled with Carbon Nanotubes Prepared by Floating Cayalyst Method", Kim et al., Macromolecular Research, vol. 10, No. 5, pp. 253-258, 2002.*

(Continued)

*Primary Examiner* — Kenneth Douyette
(74) *Attorney, Agent, or Firm* — Christie, Parker & Hale, LLP (57) ABSTRACT

A positive electrode for a rechargeable lithium battery including a current collector and a positive active material layer disposed on the current collector, a method of manufacturing the positive electrode, and a rechargeable lithium battery including the positive electrode. Here, the positive active material layer includes a positive active material and a coating layer on the surface of the positive active material, wherein the coating layer is formed of a coating layer composition including carbon nano particles, polyvinylpyrrolidone, and polyvinylidene fluoride.

17 Claims, 5 Drawing Sheets

(56) References Cited

OTHER PUBLICATIONS

KIPO Office action dated Oct. 26, 2012, for Korean priority Patent application 10-2011-0075228, (4 pages).
Wang, Xiao, et al., *Preparation of Short Carbon Nanotubes and Application as an Electrode Material in Li-Ion Batteries*, Advanced Functional Materials, (2007), vol. 17, pp. 3613-3618.
Patent Abstracts of Japan Publication No. JP 2006-243476, dated Sep. 14, 2006 for JP 4452804, and Machine English Translation, 12 pages.
Zhang Qing-tang et al., A nanocarbon composite as a conducting agent to improve the electrochemical performance of $LiCoO_2$ cathode, Science Direct Journal, Sep. 2007, pp. 361-364, vol. 22, Issue 4.
Hasan, T. et al., Polymer-Assisted Isolation of Single Wall Carbon Nanotubes in Organic Solvents for Optical-Quality Nanotube-Polymer Composites, J. Phys. Chemical C, Oct. 12, 2008, 6 pages, vol. 112, No. 51.
KIPO Notice of Allowance dated Apr. 23, 2013, for Korean priority Patent application 10-2011-0075228, (5 pages).
Korean Patent Abstracts for Korean Publication 10-2005-0097711, dated Oct. 10, 2005, corresponding to Korean Patent 10-0681268 listed above.

\* cited by examiner

POSITIVE ELECTRODE FOR RECHARGEABLE LITHIUM BATTERY, METHOD OF PREPARING THE SAME, AND RECHARGEABLE LITHIUM BATTERY INCLUDING THE SAME

CROSS-REFERENCE TO RELATED APPLICATION

This application claims priority to and the benefit of Korean Patent Application No. 10-2011-0075228, filed in the Korean Intellectual Property Office on Jul. 28, 2011, the entire content of which is incorporated herein by reference.

BACKGROUND

1. Field

This disclosure relates to a positive electrode for a rechargeable lithium battery, a method of preparing the same, and a rechargeable lithium battery including the same.

2. Description of Related Art

Lithium rechargeable batteries have recently drawn attention as a power source of small portable electronic devices. They each use an organic electrolyte solution to thereby have a discharge voltage that is at least twice or more than a comparable battery using an alkali aqueous solution, and accordingly have high energy density.

This rechargeable lithium battery is used by injecting an electrolyte into a battery cell including both a positive electrode including a positive active material that can intercalate and deintercalate lithium, and a negative electrode including a negative active material that can intercalate and deintercalate lithium.

When a positive electrode is fabricated by using carbon nanotubes as a conductive material, the high conductivity of carbon nanotubes improves conductivity of the positive electrode, thereby improving battery characteristics.

However, referring to Korean patent laid open No. 2009-0053192, since carbon nanotubes are coated on the surface of an active material using an agglomeration phenomenon according to the pH in an aqueous solution, the positive active material needs to be inevitably adjusted regarding the pH in the aqueous solution. In addition, moisture remaining on the active material or on carbon nanotubes thereon may be decomposed inside a battery containing the active material and deteriorate safety of a battery.

SUMMARY

An aspect of an embodiment of the present invention is directed toward a positive electrode for a rechargeable lithium battery having excellent electric conductivity and high adherence to a current collector, and thus having high rate and cycle-life characteristics.

Another aspect of an embodiment of the present invention is directed toward a method of manufacturing the positive electrode for a rechargeable lithium battery.

Yet another aspect of an embodiment of the present invention is directed toward a rechargeable lithium battery including the positive electrode.

According to an embodiment of the present invention, provided is a positive electrode for a rechargeable lithium battery that includes a current collector; and a positive active material layer disposed on the current collector. The positive active material layer includes a positive active material and a coating layer on the surface of the positive active material surface. The coating layer includes a coating layer composition including carbon nano particles, polyvinylpyrrolidone, and polyvinylidene fluoride.

The carbon nano particles may include carbon nanotubes, carbon nano fibers, or a combination thereof.

The positive active material layer may include the carbon nano particles in an amount of about 0.1 wt % to about 10 wt %, the polyvinylpyrrolidone in an amount of about 0.01 wt % to about 6 wt %, the polyvinylidene fluoride in an amount of about 0.5 wt % to about 10 wt %, and the positive active material in a remaining balance amount.

The polyvinylpyrrolidone and the polyvinylidene fluoride are included in a weight ratio of about 1:1.5 to about 1:9 and in particular, in a weight ratio of about 1:3 to about 1:8.

The coating layer may include the carbon nano particles each with a hydrophilic functional group on its surface. The hydrophilic functional group may include a carbonyl group, a hydroxyl group, or a combination thereof. The mole ratio of the hydroxyl group to the carbonyl group ranges from about 0.5 to about 1.

An absorbance ratio at about 1667 $cm^{-1}$ peak and about 1397 $cm^{-1}$ peak (absorbance at about 1667 $cm^{-1}$ peak/absorbance at about 1397 $cm^{-1}$ peak) of the positive active material layer may be in a range of about 0.5 to about 1.

The coating layer composition may further include a carbon-based material. The carbon-based material may include natural graphite, artificial graphite, carbon black, acetylene black, ketjen black, amorphous carbon powder, or a combination thereof.

The carbon nano particles and the carbon-based material are mixed in a weight ratio of about 1:9 to about 9:1.

The carbon-based material may have a surface area in a range from about 5 $m^2/g$ to about 2,000 $m^2/g$.

The coating layer may be formed either as a single layer including the carbon nano particles and the carbon-based material, or as a first layer including the carbon nano particles and a second layer including the carbon-based material. The second layer may have protrusions and depressions.

The positive electrode may have density in a range from about 3.0 g/cc to about 4.0 g/cc.

Another embodiment of the present invention provides a method of manufacturing the positive electrode for a rechargeable lithium battery. The method includes preparing a dispersion liquid by mixing carbon nano particles, polyvinylpyrrolidone, and polyvinylidene fluoride; mixing the dispersion solution, a positive active material, and polyvinylidene fluoride to prepare a positive active material layer composition; and coating the positive active material layer composition on a current collector.

The positive active material layer composition may further include a carbon-based material and in particular, may be prepared by mixing the dispersion solution, the positive active material, and the polyvinylidene fluoride for a set or predetermined time and adding the carbon-based material thereto.

The carbon nano particles and the carbon-based material may be mixed in a weight ratio of about 1:9 to about 9:1.

The polyvinylpyrrolidone and the polyvinylidene fluoride may be mixed in a weight ratio of about 1:1.5 to about 1:9 and in particular, in a weight ratio of about 1:3 to about 1:8.

According to another embodiment of the present invention, provided is a rechargeable lithium battery including the positive electrode; a negative electrode; and an electrolyte impregnating the positive electrode and the negative electrode.

Hereinafter, further embodiments of this disclosure will be described in detail.

Accordingly, the positive electrode has excellent electric conductivity and high adherence and thus, may realize a rechargeable lithium battery with high rate and cycle-life characteristics.

DETAILED DESCRIPTION

Exemplary embodiments of this disclosure will hereinafter be described in detail. However, these embodiments are only exemplary, and this disclosure is not limited thereto.

According to an embodiment of the present invention, a positive electrode for a rechargeable lithium battery may include a current collector and a positive active material layer disposed on the current collector. The positive active material layer may include a positive active material and a coating layer on the surface of the positive active material. The coating layer may include a coating layer composition including a carbon nano particle, polyvinylpyrrolidone, and polyvinylidene fluoride.

The coating layer is formed of the coating layer composition and has a structure in which the positive active material is coated with the carbon nano particle. Accordingly, the positive electrode may have excellent electric conductivity.

The carbon nano particle may include carbon nanotube, carbon nano fiber, or a combination thereof.

Here, it should be apparent to one skilled in the art that there can be a plurality of carbon nano particles in the coating layer composition, and in one embodiment, the carbon nano particles may have an average diameter in a range from about 10 nm to about 50 nm.

The polyvinylpyrrolidone as a dispersing agent may play a role of uniformly dispersing entangled carbon nano particles. Accordingly, the carbon nano particles are uniformly coated on the surface of the positive active material. As a result, the carbon nano particles improve movement of electrons on the surface of the positive active material and accomplish excellent electric conductivity. In addition, according to one embodiment of the present invention, the polyvinylpyrrolidone is used to disperse carbon nano particles without performing an acid treatment, which may decrease time and cost, unlike a conventional method of dispersing carbon nano particles to treat the surface thereof.

Furthermore, the polyvinylpyrrolidone is used to disperse carbon nano particles and has a hydrogen bond with the polyvinylidene fluoride utilized as a binder and thus, increases dispersion stability of carbon nano particles and adherence to a current collector. In general, when a battery is repetitively charged and discharged, lithium ions are intercalated and deintercalated and bring about volume change of an electrode, which may cause active material to be detached from the electrode and deteriorate cycle-life characteristics of the battery. However, a positive electrode according to one embodiment of the present invention includes a positive active material with higher adherence to the current collector and high stability at a high rate, thereby providing improved high rate and cycle-life characteristics of a battery.

In addition, unlike a comparable method of using a water-soluble surfactant or an aqueous binder to disperse carbon nano particles, an active material has improved adherence to the current collector, which may strengthen network among the active material particles during the charge and discharge, and thus improve capacity and cycle-life characteristics of a battery.

The hydrogen bond between the polyvinylpyrrolidone and the polyvinylidene fluoride may be evaluated through FT-IR (Fourier transform infrared spectroscopy) analysis.

A carbonyl peak in the polyvinylpyrrolidone may have a peak at about 1664 $cm^{-1}$. The peak may shift to about 1667 $cm^{-1}$ when the polyvinylpyrrolidone is mixed with polyvinylidene fluoride.

An absorbance ratio at about 1667 $cm^{-1}$ peak and about 1397 $cm^{-1}$ peak of the positive active material layer may be in a range of about 0.5 to about 1.0 and in particular, in a range of about 0.6 to about 0.9.

The carbon nano particles are dispersed into the polyvinylpyrrolidone and may have a hydrophilic functional group on the surface. Herein, a repulsive force is generated and promotes the dispersion.

The hydrophilic functional group may in particular include a carbonyl group, a hydroxyl group, or a combination thereof.

In particular, both of the carbonyl group and the hydroxyl group may exist on the surface of the carbon nano particle (e.g., each of the carbon nano particles). Herein, the hydroxyl group to the carbonyl group may have a mole ratio in a range from about 0.5 to about 1 and in particular, from about 0.6 to about 0.8. In one embodiment, when the hydrophilic functional group exists within the above mole ratio range, it maintains intrinsic characteristics of the carbon nano particles and well disperses the carbon nano particles. In addition, the hydrophilic functional group may have a hydrogen bond with polyvinylidene fluoride and may stabilize dispersion of a carbon nano particle.

The polyvinylpyrrolidone is used as a dispersing agent and may be mixed with other dispersing agents. The other dispersing agents may include polyvinylalcohol, polyvinyl acetate, or a combination thereof, but is not limited thereto.

The polyvinylidene fluoride is used as a binder and may be mixed with other binders. The other binders may include polyvinylalcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyurethane, polytetrafluoroethylene, polyethylene, polypropylene, a styrene-butadiene rubber, an acrylated styrene-butadiene rubber, an epoxy resin, nylon, or the like.

The carbon nano particles may be included in an amount of about 0.1 wt % to about 10 wt % based on the entire weight of the positive active material layer and in particular, in an amount of about 0.1 wt % to about 10 wt %, or in an amount of about 0.3 wt % to about 0.5 wt %. In one embodiment, when the carbon nano particles are included within the above range, they lower resistance of charge transfer on the surface of the positive active material and apply conductivity thereto, thereby accomplishing excellent high rate and cycle-life of a battery. In addition, when a conductive material is less included in a positive electrode, a positive electrode may have high density and increase capacity per a battery with the same size.

The polyvinylpyrrolidone may be included in an amount of about 0.01 wt % to about 6 wt % based on the entire weight of the positive active material layer and in particular, in an amount of about 0.05 wt % to about 1 wt %. In one embodiment, when the polyvinylpyrrolidone is included within the above range, it effectively disperses the carbon nano particles, and in addition can be used in a small or minimum amount, and thus decreases the amount of the binder used, and resultantly increases capacity of a battery containing the polyvinylpyrrolidone, as compared with a comparable battery of the same size not containing the polyvinylpyrrolidone included within the above range.

The polyvinylidene fluoride may be included in an amount of about 0.5 wt % to about 10 wt % based on the entire weight of the positive active material layer and in particular, in an amount of about 0.5 wt % to about 5 wt %. In one embodiment, when the polyvinylidene fluoride is included within the above range, it has a hydrogen bond with polyvinylpyrrolidone as a dispersing agent and thus, increases adhesion to a current collector, thereby improving high rate and cycle-life characteristics of a battery.

The polyvinylpyrrolidone and the polyvinylidene fluoride may be included in a weight ratio ranging from about 1:1.5 to about 1:9 and in particular, about 1:3 to about 1:8. In one embodiment, when the polyvinylpyrrolidone and the polyvinylidene fluoride are included within the ratio range, they effectively disperse carbon nano particles and improve adhesion to a current collector due to their hydrogen bond.

The carbon nano particles are used as a conductive material and may be mixed with other conductive materials. The other conductive materials may include a carbon-based material or metal powder, metal fiber, and the like of copper, nickel, aluminum, silver, and the like, or a mixture of more than one conductive material such as polyphenylene derivative, and the like.

The carbon-based material may include natural graphite, artificial graphite, carbon black, acetylene black, ketjen black, amorphous carbon powder, or a combination thereof.

When the coating layer is formed by using the carbon nano particles and the carbon-based material, the coating layer may include the carbon nano particles and the carbon-based material as a single layer. In other words, the carbon nano particles and the carbon-based material are mixed on the surface of the positive active material and coated as a single layer thereon. Otherwise, the coating layer may include a first layer including the carbon nano particles and a second layer including the carbon-based material on the first layer. The second layer may have protrusions and depressions.

When the carbon-based material is formed as a separate coating layer with protrusions and depressions from the carbon nano particles, it may increase contact points in the positive active material and decrease resistance against ion movement on the surface of the positive active material, and thus may increase electron movement all over the electrode and improve electric conductivity.

The carbon-based material may have a surface area in a range from about 5 m$^2$/g to about 2,000 m$^2$/g and in particular, about 10 m$^2$/g to about 1,500 m$^2$/g. In addition, the carbon-based material may include an interplanar distance (d002) of carbon in a range from about 3 Å to about 10 Å and in particular, from about 3.3 Å to about 5 Å. A carbon-based material having a surface area within the provided range and a carbon interplanar distance within the provided range, increases contact points among positive active material particles, which increases electron movement while leaving a space among the positive active material particles, thus inhibits ion movement in an electrolyte, and resultantly increases the high-rate capability of a battery.

The carbon nano particles and the carbon-based material may be included in a weight ratio of about 1:9 to about 9:1 and in particular, about 5:5 to about 8:2. In one embodiment, when the carbon nano particles and the carbon-based material are included within the ratio range, a positive active material has a space among the particles despite high density, and thus accomplishes high power characteristics of an electrode with high density.

The positive active material includes a lithiated intercalation compound that reversibly intercalates and deintercalates lithium ions. The positive active material may include a composite oxide including at least one selected from the group consisting of cobalt, manganese, and nickel, as well as lithium. In particular, the following lithium-containing compounds may be used:

$Li_aA_{1-b}B_bD_2$ (0.90≤a≤1.8 and 0≤b≤0.5); $Li_aE_{1-b}B_bO_{2-c}D_c$ (0.90≤a≤1.8, 0≤b≤0.5, and 0≤c≤0.05); $Li_aE_{2-b}B_bO_{4-c}D_c$ (0.90≤a≤1.8, 0≤b≤0.5, and 0≤c≤0.05); $Li_aNi_{1-b-c}Co_bB_cD_\alpha$ (0.90≤a≤1.8, 0≤b≤0.5, 0≤c≤0.05, and 0<α≤2); $Li_aNi_{1-b-c}Co_bB_cO_{2-\alpha}F_\alpha$ (0.90≤a≤1.8, 0≤b≤0.5, 0≤c≤0.05, and 0<α<2); $Li_aNi_{1-b-c}Co_bB_cO_{2-\alpha}F_2$ (0.90≤a≤1.8, 0≤b≤0.5, 0≤c≤0.05, and 0<α<2); $Li_aNi_{1-b-c}Mn_bB_cD_\alpha$ (0.90≤a≤1.8, 0≤b≤0.5, 0≤c≤0.05, and 0<α≤2); $Li_aNi_{1-b-c}Mn_bB_cO_{2-\alpha}F_\alpha$ (0.90≤a≤1.8, 0≤b≤0.5, 0≤c≤0.05, and 0<α<2); $Li_aNi_{1-b-c}Mn_bB_cO_{2-\alpha}F_2$ (0.90≤a≤1.8, 0≤b≤0.5, 0≤c≤0.05, and 0<α<2); $Li_aNi_bE_cG_dO_2$ (0.90≤a≤1.8, 0≤b≤0.9, 0≤c≤0.5, and 0.001≤d≤0.1); $Li_aNi_bCo_cMn_dG_eO_2$ (0.90≤a≤1.8, 0≤b≤0.9, 0≤c≤0.5, 0≤d≤0.5, and 0.001≤e≤0.1); $Li_aNiG_bO_2$ (0.90≤a≤1.8, 0.001≤b≤0.1); $Li_aCoG_bO_2$ (0.90≤a≤1.8, and 0.001≤b≤0.1); $Li_aMnG_bO_2$ (0.90≤a≤1.8, and 0.001≤b≤0.1); $Li_aMn_2G_bO_4$ (0.90≤a≤1.8, and 0.001≤b≤0.1); $QO_2$; $QS_2$; $LiQS_2$; $V_2O_5$; $LiV_2O_5$; $LiIO_2$; $LiNiVO_4$; $Li_{(3-f)}J_2(PO_4)_3$ (0≤f≤2); $Li_{(3-f)}Fe_2(PO_4)_3$ (0≤f≤2); or $LiFePO_4$.

In the context of the above formulas, A is selected from Ni, Co, Mn, or a combination thereof; B is selected from Al, Ni, Co, Mn, Cr, Fe, Mg, Sr, V, a rare earth element, or a combination thereof; D is selected from O, F, S, P, or a combination thereof; E is selected from Co, Mn, or a combination thereof; F is selected from F, S, P, or a combination thereof; G is selected from Al, Cr, Mn, Fe, Mg, La, Ce, Sr, V, or a combination thereof; Q is selected from Ti, Mo, Mn, or a combination thereof; I is selected from Cr, V, Fe, Sc, Y, or a combination thereof; and J is selected from V, Cr, Mn, Co, Ni, Cu, or a combination thereof.

The compound may have a coating layer on the surface, or may be mixed with another compound having a coating layer. The coating layer may include at least one coating element compound selected from the group consisting of an oxide of a coating element, a hydroxide of a coating element, an oxyhydroxide of a coating element, an oxycarbonate of a coating element, and a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method having no adverse influence on properties of a positive active material by using these elements in the compound. For example, the method may include any coating method such as spray coating, dipping, and the like, but is not illustrated in more detail since it is well-known to those who work in the related field.

The positive active material may be included at a balanced amount based on the entire weight of the positive active material layer.

According to one embodiment of the present invention, a positive active material may be coated with carbon nano particles, polyvinylidene fluoride, and polyvinylpyrrolidone, and thus accomplish a rechargeable lithium battery with excellent high rate and cycle-life as well as excellent electric conductivity. In particular, when the positive active material surface is coated with the carbon nano particles, a carbon-based material is further coated and brings about excellent electric conductivity. In addition, the carbon nano particles are dispersed by a dispersing agent like the polyvinylpyrrolidone and uniformly coated on the surface of the positive active material. Herein, the polyvinylidene fluoride and the polyvinylpyrrolidone have a hydrogen bond that improves adherence to a current collector, resultantly bringing about excellent high rate and cycle-life.

When the positive active material layer is formed on the current collector, the current collector may be formed of Al, but is not limited thereto.

The positive electrode may be fabricated in the following method.

A carbon nano particle (or carbon nano particles), a dispersing agent including polyvinylpyrrolidone, a binder including polyvinylidene fluoride, and a solvent are mixed to prepare a dispersion liquid. During this step, a carbon nano particle having a hydrophilic functional group on its surface may be prepared. Then, the dispersion liquid, a positive active material, a binder including polyvinylidene fluoride, a solvent, and a selectively chosen carbon-based material are mixed, thereby preparing a positive active material layer composition. Then, the positive active material layer composition is coated on a current collector, thereby fabricating a positive electrode. The positive electrode may have a structure such that the positive active material is coated with the carbon nano particle on its surface.

In particular, the dispersion liquid may be prepared by dispersing the carbon nano particles and the polyvinylpyrrolidone into the solvent for a set or predetermined time and adding the polyvinylidene fluoride thereto. Accordingly, the polyvinylpyrrolidone and the polyvinylidene fluoride may have a hydrogen bond, which may stabilize the dispersion and help dispersion of an excessive amount of the carbon nano particles.

Herein, the dispersion liquid, the positive active material, and the binder are mixed for a set or predetermined time, so that the carbon nano particles may be sufficiently coated on the positive active material, and the carbon-based material may be added thereto. When the carbon nano particles are coated on the surface of the positive active material ahead of the carbon-based material, they may improve ion movement on the surface of the positive active material, increase contact points among positive active material particles, and improve ion movement all over an electrode, resultantly maximizing improvement of electric conductivity.

The solvent may include N-methylpyrrolidone and the like, but is not limited thereto.

When a positive electrode is fabricated in the following method, a conductive material and a binder may be less used, thereby fabricating an electrode with high density.

The positive electrode may have density in a range from about 3.0 g/cc to about 4.0 g/cc and in particular, about 3.4 g/cc to about 3.8 g/cc. According to one embodiment of the present invention, an electrode with high density may accomplish high power characteristics as aforementioned.

Hereinafter, a rechargeable lithium battery including the positive electrode is described referring to FIG. 1.

Figure 1:
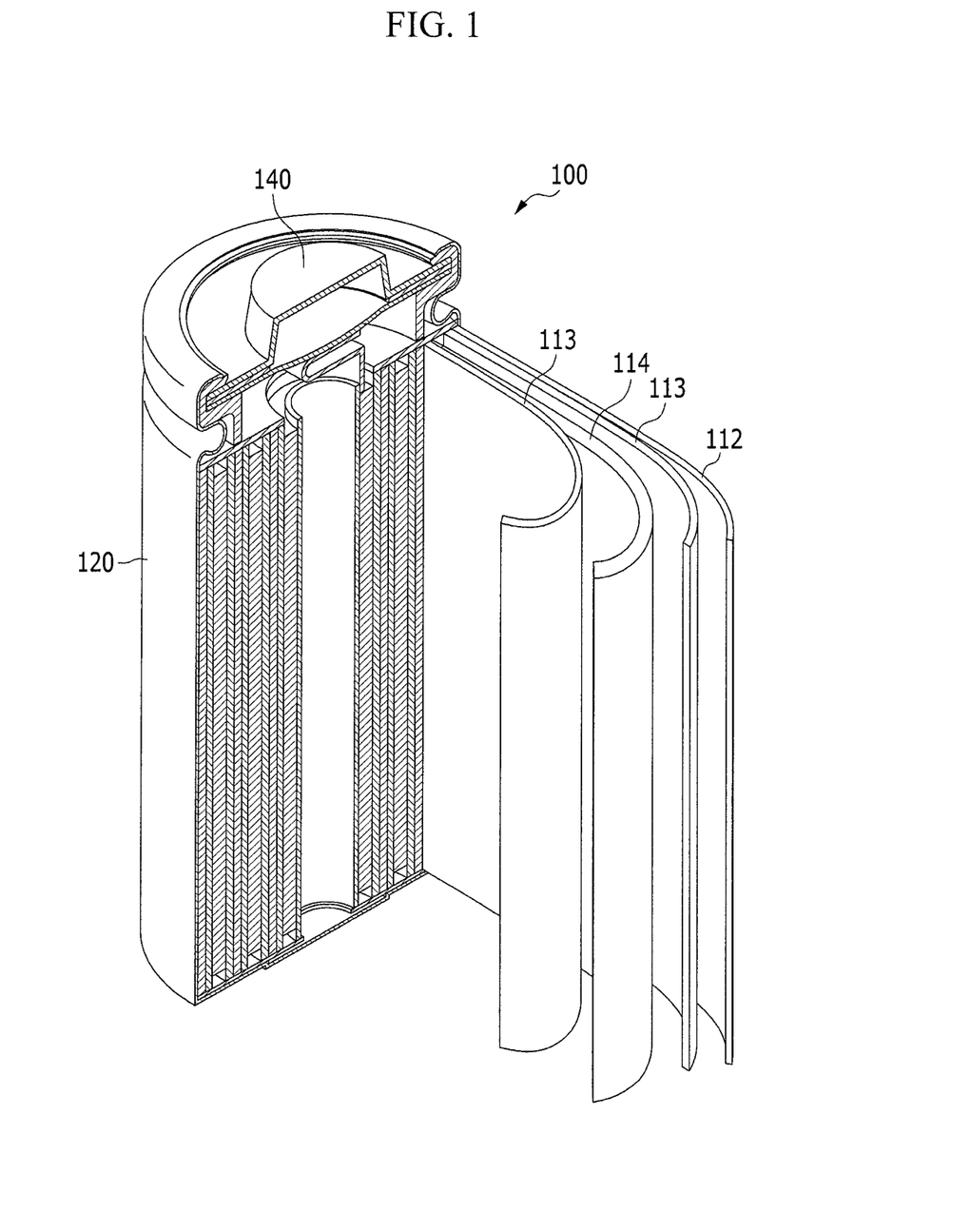
FIG. 1 is the schematic view of a rechargeable lithium battery according to one embodiment.

FIG. 1 is the schematic view of a rechargeable lithium battery according to one embodiment.

FIG. 1 illustrates a rechargeable lithium battery 100, which includes an electrode assembly (including a negative electrode 112, a positive electrode 114, and a separator 113 interposed between the negative electrode 112 and the positive electrode 114); an electrolyte impregnating the separator 113, the positive electrode 114, and/or the negative electrode 114; a battery case 120 housing the electrode assembly; and a sealing member 140 sealing the battery case 120.

The positive electrode is the same as described above.

The negative electrode 112 includes a negative current collector and a negative active material layer disposed on the negative current collector.

The current collector may include a copper foil.

The negative active material layer includes a binder, and optionally a conductive material.

The negative active material includes a material that reversibly intercalates/deintercalates lithium ions, a lithium metal, a lithium metal alloy, a material being capable of doping/dedoping lithium, or a transition metal oxide.

The material that reversibly intercalates/deintercalates lithium ions includes a carbon material. The carbon material may be any suitable carbon-based negative active material in a lithium ion rechargeable battery. Examples of the carbon material include crystalline carbon, amorphous carbon, or a mixture thereof. The crystalline carbon may be non-shaped, or may be sheet, flake, spherical, or fiber shaped. The crystalline carbon may be made of natural graphite or artificial graphite. The amorphous carbon may be a soft carbon, a hard carbon, mesophase pitch carbonized product, fired coke, or the like.

Examples of the lithium metal alloy include lithium and a metal selected from the group consisting of Na, K, Rb, Cs, Fr, Be, Mg, Ca, Sr, Si, Sb, Pb, In, Zn, Ba, Ra, Ge, Al, Sn, and combinations thereof.

Examples of the material being capable of doping and dedoping lithium include Si, $SiO_x$ (0<x<2), an Si—C composite, an Si—Y alloy (where Y is an element selected from the group consisting of alkali metals, alkaline-earth metals, Group 13 to 16 elements, transition elements, rare earth elements, and combinations thereof, and not Si), Sn, $SnO_2$, an Sn—C composite, an Sn—Y alloy (where Y is an element selected from the group consisting of alkali metals, alkaline-earth metals, Group 13 to 16 elements, transition elements, rare earth elements, and combinations thereof and is not Sn), or mixtures thereof. At least one of these materials may be mixed with $SiO_2$. The element Y may include one selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

Examples of the transition metal oxide include vanadium oxide, lithium vanadium oxide, or the like.

The binder improves binding properties of the negative active material particles to each other and to a current collector. Examples of the binder include at least one selected from the group consisting of polyvinyl alcohol, carboxylmethyl cellulose, hydroxypropyl cellulose, polyvinyl chloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like, but are not limited thereto.

Any electrically conductive material may be used as a conductive material unless it causes a chemical change. Examples of the conductive material include:

carbon-based materials such as natural graphite, artificial graphite, carbon black, acetylene black, ketjen black, a carbon fiber, or the like; a metal-based material of a metal powder or a metal fiber including copper, nickel, aluminum, silver, or the like; a conductive polymer such as a polyphenylene derivative; or mixtures thereof.

The negative electrode 112 may be manufactured by a method including mixing the active material, a binder, and optionally a conductive material in an organic solvent to provide an active material composition, and coating the composition on a current collector. The solvent may be N-methylpyrrolidone, but it is not limited thereto.

The electrolyte may include an organic solvent and a lithium salt.

The non-aqueous organic solvent serves as a medium for transmitting ions taking part in the electrochemical reaction of the battery. The non-aqueous organic solvent may include a carbonate-based, ester-based, ether-based, ketone-based, alcohol-based, or aprotic solvent.

Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), or the like.

When a linear carbonate compound and a cyclic carbonate compound are mixed with each other, the dielectric constant increases and the viscosity decreases. The cyclic carbonate compound and linear carbonate compound are mixed together in the volume ratio of about 1:1 to about 1:9.

Examples of the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and the like. Examples of the ether-based solvent include dibutylether, tetraglyme, diglyme, dimethoxyethane, 2-methyltetrahydrofuran, tetrahydrofuran, and the like, and examples of the ketone-based solvent include cyclohexanone, or the like. Examples of the alcohol-based solvent include ethyl alcohol, isopropyl alcohol, or the like.

The non-aqueous organic solvent may be used singularly or in a mixture. When the organic solvent is used in a mixture, the mixture ratio may be controlled in accordance with a desirable battery performance.

The non-aqueous electrolyte solution may further include an overcharge-inhibiting compound such as ethylene carbonate, pyrocarbonate, and the like.

The lithium salt supplies lithium ions in the battery, and performs a basic operation of a rechargeable lithium battery and improves lithium ion transport between positive and negative electrodes.

Examples of the lithium salt include $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, $LiB(C_2O_4)_2$ (lithium bisoxalate borate, LiBOB), or a combination thereof.

The lithium salt may be used at a concentration in a range from about 0.1M to about 2.0M. In one embodiment, when the lithium salt is included at the above concentration range, electrolyte performance and lithium ion mobility are enhanced due to desire or optimal electrolyte conductivity and viscosity.

The separator 113 may be formed as a single layer or a multilayer, and may be made of polyethylene, polypropylene, polyvinylidene fluoride, or a combination thereof.

Hereinafter, the embodiments are illustrated in more detail with reference to examples. However, the following are examples and are not limiting.

Furthermore, what is not described in this specification can be sufficiently understood by those who have knowledge in this field and will not be illustrated here.

Fabrication of Rechargeable Lithium Battery Cell

EXAMPLE 1

Carbon nanotubes with 20 nm of an average diameter and polyvinylpyrrolidone were added to N-methylpyrrolidone and then, agitated for 12 hours or more, thereby preparing a dispersion liquid.

Next, polyvinylidene fluoride was added to the dispersion liquid. The mixture was milled with a bead mill for 10 minutes or more, and a positive active material, $LiCoO_2$, carbon black with a surface area of 70 $m^2/g$, the polyvinylidene fluoride, and N-methylpyrrolidone were added thereto, preparing a positive active material layer composition. Herein, the positive active material layer composition includes 95 wt % of the positive active material, 1 wt % of the carbon nanotubes, 2.6 wt % of the polyvinylidene fluoride, 0.4 wt % of the polyvinylpyrrolidone, and 1 wt % of the carbon black.

Then, the positive active material layer composition was coated on a 60 μm-thick aluminum, dried at 135° C. for 3 hours or more, and compressed to have density of 3.5 g/cc, thereby fabricating a positive electrode.

The positive electrode and a lithium metal as a counter electrode were used to fabricate a coin-type half-cell. Herein, an electrolyte was prepared by mixing ethylenecarbonate (EC), dimethylcarbonate (DMC), and diethylcarbonate (DEC) in a volume ratio of 3:4:3 and dissolving $LiPF_6$ in a 1M concentration.

EXAMPLE 2

A half-cell was fabricated according to the same method as Example 1 except for fabricating a positive electrode with a density of 3.7 g/cc.

EXAMPLE 3

A half-cell was fabricated according to the same method as Example 1 except for fabricating a positive electrode with a density of 3.9 g/cc.

EXAMPLE 4

A half-cell was fabricated according to the same method as Example 1 except for using carbon black with a surface area of 300 $m^2/g$.

EXAMPLE 5

A half-cell was fabricated according to the same method as Example 1 except for using carbon black with a surface area of 950 $m^2/g$.

EXAMPLE 6

A half-cell was fabricated according to the same method as Example 1 except for mixing carbon black with a surface area of 70 $m^2/g$ and carbon black with a surface area of 950 $m^2/g$ in a weight ratio of 5:5.

EXAMPLE 7

A half-cell was fabricated according to the same method as Example 1 except for using a graphite flake with an average diameter of 6 μm. Herein, a positive active material layer composition includes 93 wt % of the positive active material, 1 wt % of the carbon nanotubes, 2.6 wt % of the polyvinylidene fluoride, 0.4 wt % of the polyvinylpyrrolidone, 1 wt % of the carbon black, and 2 wt % of the graphite flake (artificial graphite). The graphite flake had a surface area of 21.5 m$^2$/g and an interplanar distance (d002) of 3.358 Å.

EXAMPLE 8

A half-cell was fabricated according to the same method as Example 1 except for fabricating a positive electrode by using amorphous carbon powder with an average diameter of 4.6 μm. Herein, a positive active material layer composition includes 93 wt % of the positive active material, 1 wt % of the carbon nanotubes, 2.6 wt % of the polyvinylidene fluoride, 0.4 wt % of the polyvinylpyrrolidone, 1 wt % of the carbon black, and 2 wt % of the amorphous carbon powder. The amorphous carbon powder had a surface area of 50.9 m$^2$/g and an interplanar distance (d002) of 3.5 Å.

EXAMPLE 9

Carbon nanotubes with an average diameter of 20 nm and polyvinylpyrrolidone were added to N-methylpyrrolidone. The mixture was agitated for 12 hours or more, thereby preparing a dispersion liquid.

Next, polyvinylidene fluoride was added to the dispersion liquid. The mixture was milled with a bead mill for 10 minutes or more, and a positive active material, LiCoO$_2$, the polyvinylidene fluoride, and N-methylpyrrolidone were added thereto, thereby preparing a positive active material layer composition. Herein, the positive active material layer composition includes 96 wt % of the positive active material, 1 wt % of the carbon nanotubes, 2.6 wt % of the polyvinylidene fluoride, and 0.4 wt % of the polyvinylpyrrolidone.

The positive active material layer composition was coated on a 60 μm-thick aluminum, dried at 135° C. for 3 hours or more, and compressed to have density of 3.5 g/cc, thereby fabricating a positive electrode.

The positive electrode and a lithium metal as a counter electrode were used to fabricate a coin-type half-cell. Herein, an electrolyte was prepared by mixing ethylenecarbonate (EC), dimethylcarbonate (DMC), and diethylcarbonate (DEC) in a volume ratio of 3:4:3 of mixed solution and dissolving LiPF$_6$ with a 1M concentration therein.

EXAMPLE 10

A half-cell was fabricated according to the same method as Example 1 except for preparing a positive active material layer composition with the following composition.

The positive active material layer composition included 95 wt % of the positive active material, 1 wt % of the carbon nanotubes, 2.2 wt % of the polyvinylidene fluoride, 0.8 wt % of the polyvinylpyrrolidone, and 1 wt % of the carbon black.

EXAMPLE 11

A half-cell was fabricated according to the same method as Example 1 except for preparing a positive active material layer composition with the following composition.

The positive active material layer composition included 95 wt % of the positive active material, 1 wt % of the carbon nanotubes, 2.5 wt % of the polyvinylidene fluoride, 0.5 wt % of the polyvinylpyrrolidone, and 1 wt % of the carbon black.

COMPARATIVE EXAMPLE 1

A positive active material layer composition was prepared by adding 95 wt % of a positive active material, LiCoO$_2$, 2 wt % of a mixture of carbon nanotubes and carbon black, and 3 wt % of polyvinylidene fluoride in N-methylpyrrolidone.

Next, the positive active material layer composition was coated on a 60 μm-thick aluminum foil, dried at 135° C. for 3 hours or more, and compressed to have density of 3.5 g/cc, thereby fabricating a positive electrode.

The positive electrode was used to fabricate a half-cell according to the same method as Example 1.

REFERENCE EXAMPLE 1

A half-cell was fabricated according to the same method as Example 1 except for preparing a positive active material layer composition with the following composition.

The positive active material layer composition includes 95 wt % of the positive active material, 1 wt % of the carbon nanotubes, 1.5 wt % of the polyvinylidene fluoride, 1.5 wt % of the polyvinylpyrrolidone, and 1 wt % of the carbon black.

REFERENCE EXAMPLE 2

A half-cell was fabricated according to the same method as Example 1 except for preparing a positive active material layer composition with the following composition.

The positive active material layer composition included 95 wt % of the positive active material, 1 wt % of the carbon nanotubes, 1 wt % of the polyvinylidene fluoride, 2 wt % of the polyvinylpyrrolidone, and 1 wt % of the carbon black.

Evaluation 1: SEM Photograph of Positive Active Material Layer

Figure 2:
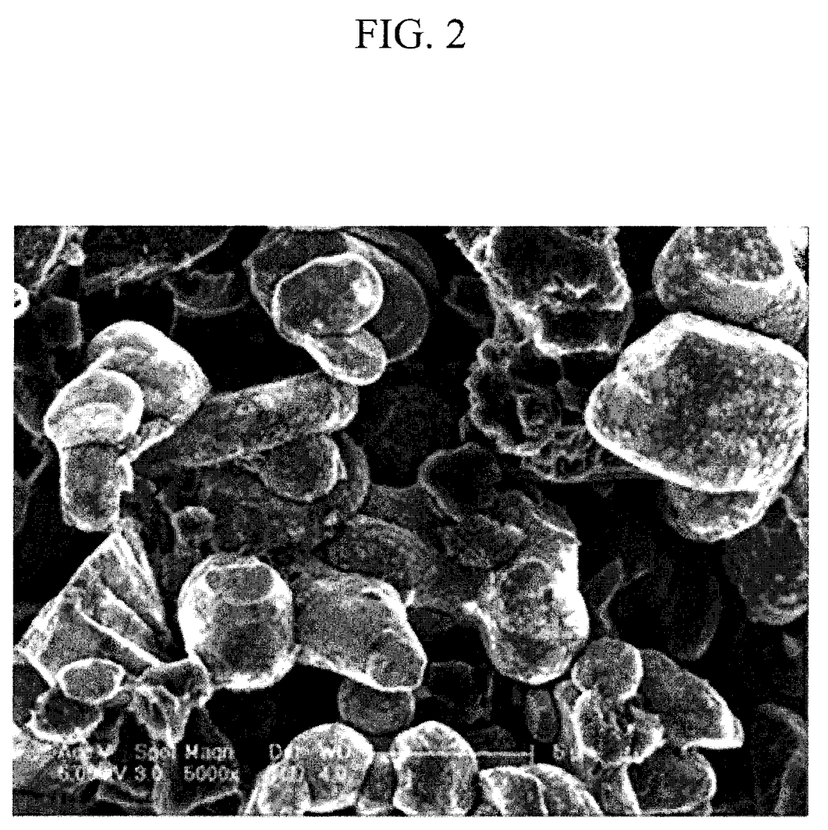
FIG. 2 is an SEM (scanning electron microscope) photograph of a positive active material layer according to Example 1.
Figure 3:
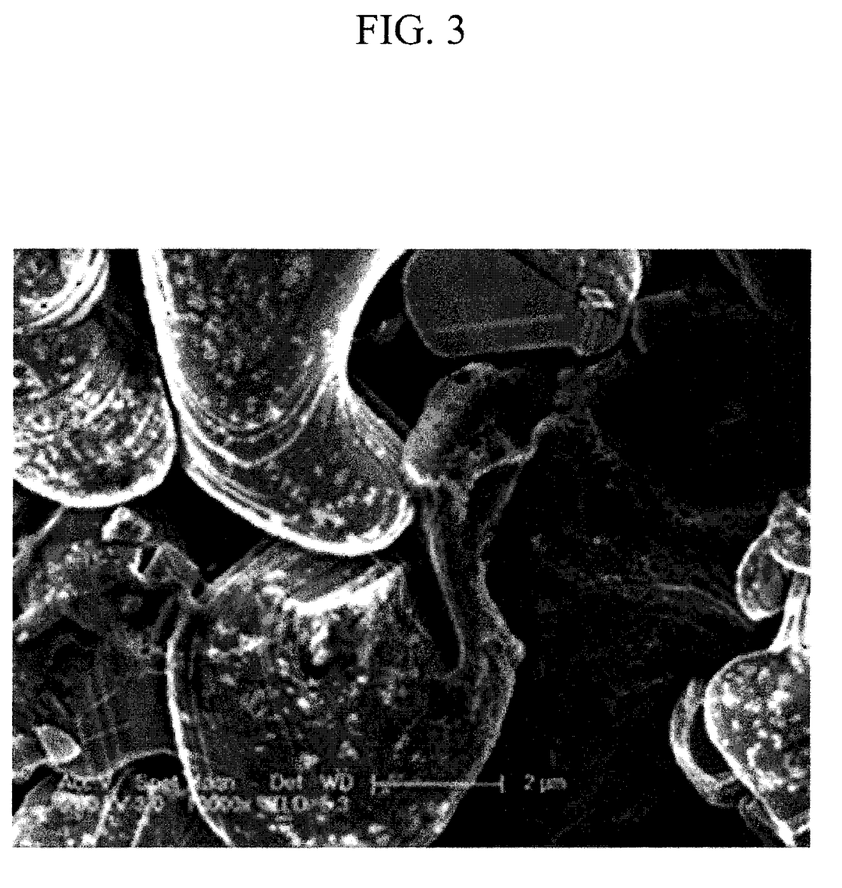
FIG. 3 is an SEM photograph of a positive active material layer according to Comparative Example 1.
Figure 4:
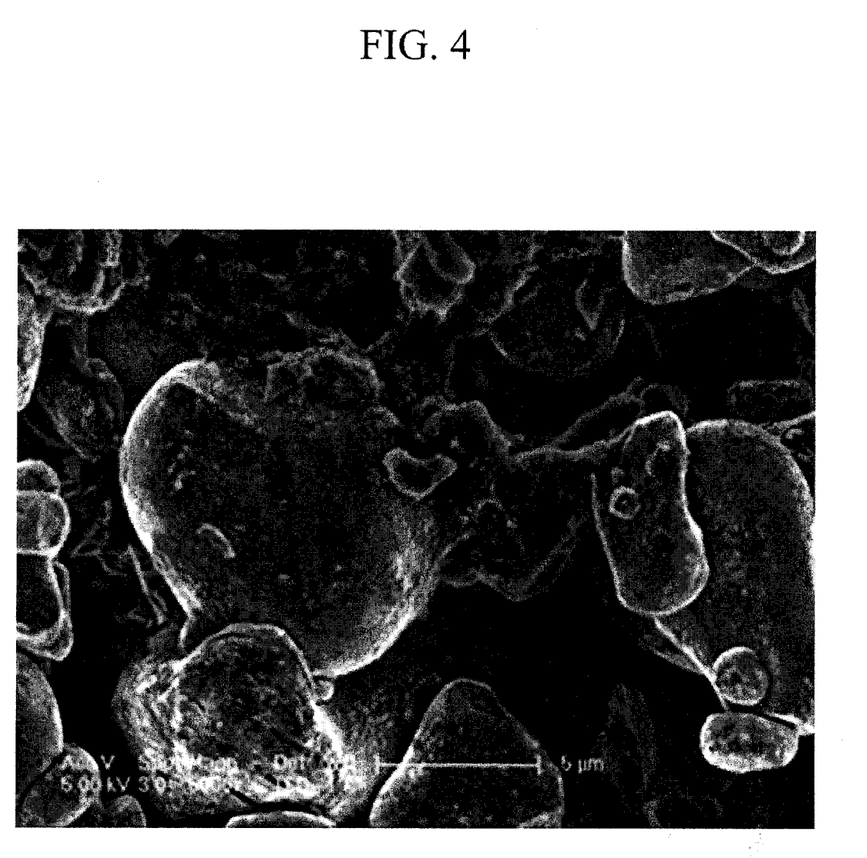
FIG. 4 is an SEM photograph of a positive active material layer according to Reference Example 1.

FIG. 2 provides a scanning electron microscope (SEM) photograph of the positive active material layer according to Example 1, FIG. 3 is an SEM photograph of the positive active material layer according to Comparative Example 1, and FIG. 4 is an SEM photograph of the positive active material layer according to Reference Example 1.

Referring to FIGS. 2 to 4, the positive active material layers according to Example 1 and Reference Example 1 included carbon nano particles on the surface, unlike the positive active material layer according to Comparative Example 1.

Evaluation 2: Hydrogen Bond Peak

Figure 5:
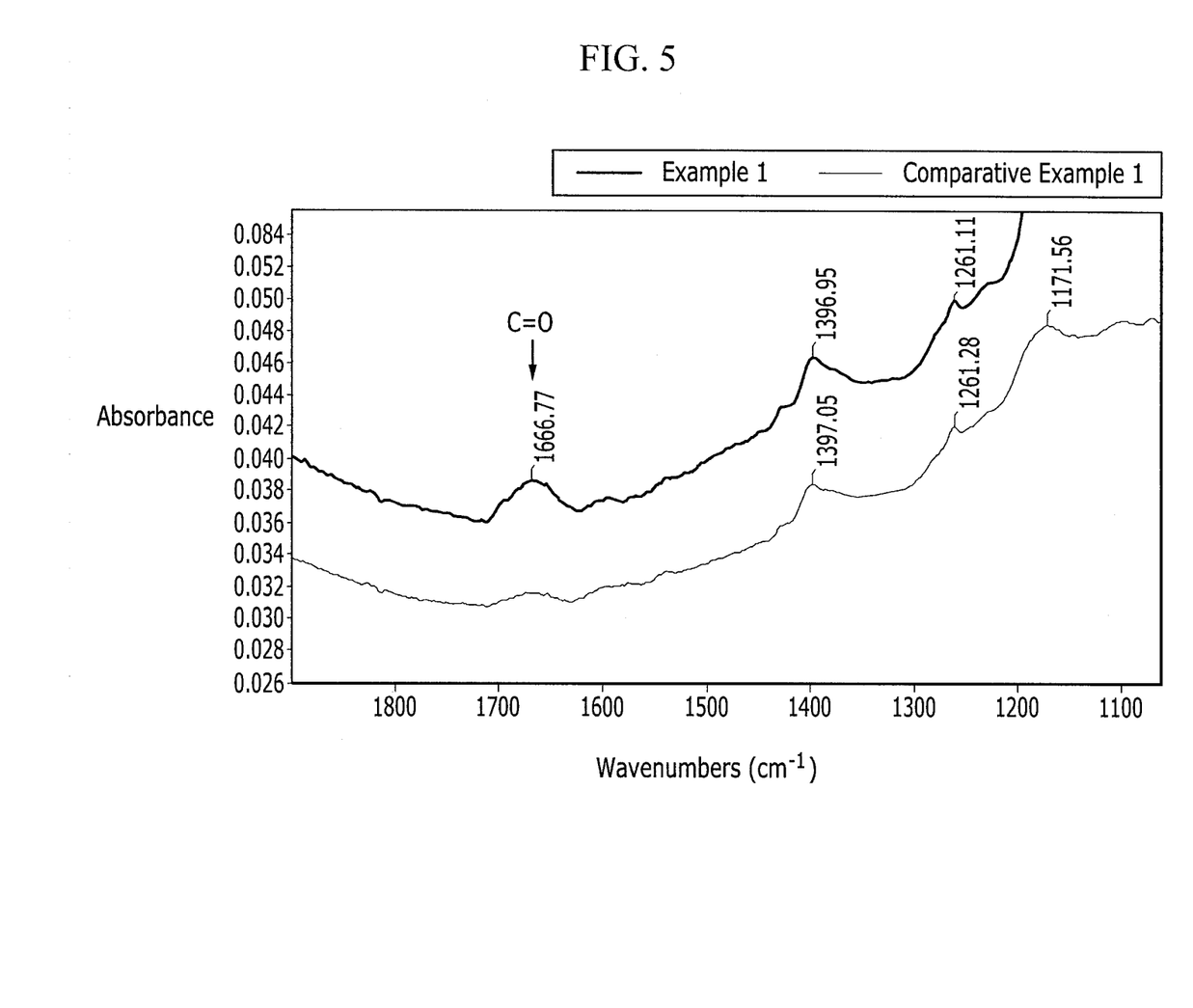
FIG. 5 is an FT-IR (Fourier transform infrared spectroscopy) graph of the positive active material layer compositions according to Example 1 and Comparative Example 1.

FIG. 5 provides an FT-IR (Fourier transform infrared spectroscopy) graph of the positive active material layer compositions according to Example 1 and Comparative Example 1.

Referring to FIG. 5, while a carbonyl group in polyvinylpyrrolidone had a peak of 1664 cm$^{-1}$, a carbonyl group in a mixture of polyvinylpyrrolidone with polyvinylidene fluoride had a peak of 1667 cm$^{-1}$ according to Example 1. Also, in Example 1, an absorbance ratio of a 1667 cm$^{-1}$ peak against a 1397 cm$^{-1}$ peak is 0.8, while in Comparative Example 1, an absorbance ratio of a 1667 cm$^{-1}$ peak against a 1397 cm$^{-1}$ peak is 0.39. Accordingly, Example 1 had hydrogen bond between polyvinylpyrrolidone and polyvinylidene fluoride.

Evaluation 3: Binding Ability Evaluation

The positive electrodes according to Examples 1 to 11, Comparative Example 1, and Reference Examples 1 and 2 were cut to have a size of 2 cm×5 cm and attached to a slide glass, and then were detached with the same strength by using a tensile strength tester (Instron Co.) to evaluate their binging abilities. The results are provided in the following Table 1.

TABLE 1

|  | Adherence (fg/mm) |
| --- | --- |
| Example 1 | 14.58 |
| Example 2 | 15.8 |
| Example 3 | 15.6 |
| Example 4 | 13.97 |
| Example 5 | 13.79 |
| Example 6 | 14.005 |
| Example 7 | 13.605 |
| Example 8 | 13.33 |
| Example 9 | 14.3 |
| Example 10 | 13.27 |
| Example 11 | 13.6 |
| Comparative Example 1 | 8.465 |
| Reference Example 1 | 11.3 |
| Reference Example 2 | 10.23 |

Referring to Table 1, the positive electrodes of Examples 1 to 11 and Reference Examples 1 and 2 had better adherence than that of Comparative Example 1. Accordingly, when a coating layer composition including a carbon nano particle, polyvinylpyrrolidone, and polyvinylidene fluoride was coated on the surface of a positive active material, the polyvinylpyrrolidone and the polyvinylidene fluoride had a hydrogen bond, and thus had improved adherence of a positive electrode.

Evaluation 4: High-Rate Capability of Rechargeable Lithium Battery Cell

The rechargeable lithium batteries according to Examples 1 to 11, Comparative Example 1, and Reference Examples 1 and 2 were charged and discharged as follows and measured regarding cycle-life at a high rate. The results are provided in the following Table 2.

The rechargeable lithium batteries were charged at 0.2 C, cut off at 4.3V, and paused for 20 minutes; then discharged at 0.2 C, cut off at 3V, and paused for 20 minutes (formation process). The formation process was repeated three times.

Then, the rechargeable lithium batteries were charged at 0.2 C, cut off at 4.3V, and paused for 20 minutes and then discharged at 1 C, cut off at 3V and paused for 20 minutes, then discharged at 1 C, cut off at 3V, and paused for 20 minutes. The discharge capacity indicated as the initial capacity in Table 1. The resulting rechargeable lithium batteries were then charged at 0.2 C, cut off at 4.3V, and paused for 20 minutes; and then discharged at 10 C, cut off at 3V, and paused for 20 minutes.

In addition, the rechargeable lithium batteries were charged at 1 C, cut off at 4.3V, and paused for 20 minutes; then discharged at 0.2 C, cut off at 3V, and paused for 20 minutes and then, charged at 10 C, cut off at 4.3V, and paused for 20 minutes; and then discharged at 0.2 C, cut off at 3V, and paused for 20 minutes.

The following discharge capacity retention (%) and charge capacity retention (%) are a percentage of capacity at 1 C against capacity at 10 C.

TABLE 2

|  | Initial capacity (0.2 C) (mAh/g) | Discharge capacity (mAh/g) | | Discharge capacity retention (10 C/1 C) (%) | Charge capacity (mAh/g) | | Charge capacity retention (10 C/1 C) (%) |
| --- | --- | --- | --- | --- | --- | --- | --- |
|  |  | 1 C | 10 C |  | 1 C | 10 C |  |
| Example 1 | 164.482 | 152.958 | 129.161 | 84.44 | 156.895 | 125.901 | 80.24 |
| Example 2 | 160.791 | 156.062 | 132.996 | 85.22 | 158.99 | 129.16 | 81.24 |
| Example 3 | 160.22 | 156.18 | 133.09 | 85.22 | 157.14 | 130.15 | 82.82 |
| Example 4 | 162.33 | 151.59 | 127.23 | 83.93 | 155.84 | 126.96 | 81.47 |
| Example 5 | 161.73 | 150.95 | 128.44 | 85.09 | 156.46 | 125.25 | 80.05 |
| Example 6 | 163.91 | 152.25 | 126.61 | 83.16 | 155.65 | 125.45 | 80.6 |
| Example 7 | 154.66 | 142.38 | 120.8 | 84.84 | 145.08 | 115.23 | 79.43 |
| Example 8 | 152.06 | 141.235 | 119.45 | 84.5 | 145.6 | 116.86 | 80.26 |
| Example 9 | 163.68 | 153.68 | 128.56 | 83.65 | 155.45 | 124.96 | 80.39 |
| Example 10 | 161.23 | 151.23 | 126.77 | 83.83 | 156.2 | 127.3 | 81.5 |
| Example 11 | 161.24 | 151.24 | 124.68 | 82.44 | 154.3 | 126.45 | 81.95 |
| Comparative Example 1 | 144.677 | 138.581 | 109.187 | 78.79 | 139.912 | 96.933 | 69.28 |
| Reference Example 1 | 150.7 | 139.8 | 113.88 | 81.46 | 142.20 | 109.41 | 76.94 |
| Reference Example 2 | 149.36 | 139.56 | 112.42 | 80.56 | 132.28 | 99.84 | 75.48 |

Referring to Table 2, the positive electrodes according to Examples 1 to 11 and Reference Examples 1 and 2 had excellent cycle-life characteristics at a high rate compared with the one according to Comparative Example 1.

In particular, the positive electrodes according to Examples 1 to 11 and Reference Examples 1 and 2 were coated with a coating layer including a carbon nano particle on the surface of a positive active material and had high electric conductivity thereon and thus, decreased interface resistance against movement of lithium ions out of and into the layer. In addition, when the positive electrodes had high density, they had a lower pore rate, but high initial capacity and capacity retention, since they did not excessively include a conductive material and had a sufficient ion transfer path.

Furthermore, the positive electrodes according to Examples 1 to 11 and Reference Examples 1 and 2 included less of a conductive material, but had high cycle-life at a high rate since carbon nano particles were coated on the surface and thus improved electric conductivity. On the contrary, the positive electrode of Comparative Example 1 included insufficiently coated particles and had an insufficient conductive path and thus, had higher resistance at a higher rate and deteriorated high rate cycle-life characteristic.

Evaluation 5: Charge and Discharge efficiency of Rechargeable Lithium Battery Cell The rechargeable lithium batteries according to Examples 1 to 11, Comparative Example 1, and Reference Examples 1 and 2 were charged and discharged in the following method and measured regarding cycle-life. The results are provided in the following Table 3.

The rechargeable lithium batteries were charged at 4 C, cut off at 4.3V, and paused for 20 minutes, and then discharged at 4 C, cut-off at 3V, and paused for 20 minutes (formation process). The formation process was repeated 100 times.

The following capacity retention (%) is a percentage of each discharge capacity at $50^{th}$ and $100^{th}$ against discharge capacity at the first cycle with 4 C.

TABLE 3

|  | Discharge capacity 4 C (mAh/g) | | | Capacity retention (%) | |
| --- | --- | --- | --- | --- | --- |
|  | $1^{st}$ cycle | $50^{th}$ cycle | $100^{th}$ cycle | $50^{th}/1^{st}$ | $100^{th}/1^{st}$ |
| Example 1 | 125.33 | 113.66 | 103.51 | 90.69 | 82.59 |
| Example 2 | 129.73 | 117.06 | 107.61 | 90.23 | 82.95 |
| Example 3 | 130.04 | 117.65 | 108.36 | 90.47 | 83.33 |
| Example 4 | 125.64 | 115.32 | 105.04 | 91.79 | 83.60 |
| Example 5 | 126.7 | 116.18 | 106.95 | 91.7 | 84.41 |
| Example 6 | 126.08 | 114.26 | 105.38 | 90.63 | 83.58 |
| Example 7 | 116.98 | 104.9 | 98.65 | 89.67 | 84.33 |
| Example 8 | 115.68 | 103.56 | 97.3 | 89.52 | 84.11 |
| Example 9 | 120.35 | 109.23 | 99.85 | 90.76 | 82.97 |
| Example 10 | 125.32 | 115.02 | 105.23 | 91.78 | 83.97 |
| Example 11 | 121.45 | 111.45 | 105.87 | 91.77 | 87.17 |
| Comparative Example 1 | 109.91 | 83.04 | 67.32 | 75.55 | 61.25 |
| Reference Example 1 | 116.96 | 99.78 | 90.76 | 85.31 | 77.6 |
| Reference Example 2 | 100.86 | 80.92 | 71.24 | 80.23 | 70.63 |

Referring to Table 3, the positive electrodes according to Examples 1 to 11 and Reference Examples 1 and 2 had excellent cycle-fife compared with the one according to Comparative Example 1.

In particular, the positive electrodes according to Examples 1 to 11 and Reference Examples 1 and 2 included a positive active material coated with a coating layer including carbon nano particles, polyvinylpyrrolidone, and polyvinylidene fluoride on the surface, improved electric conductivity and adherence, and thus, realized excellent cycle-life. On the contrary, the positive electrode according to Comparative Example 1 had a positive active material with bad adherence due to fast contraction and expansion on the interface thereof, according to fast charge and discharge at a high rate, thereby rapidly deteriorating cycle-life.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A positive electrode for a rechargeable lithium battery comprising:
   a current collector; and
   a positive active material layer on the current collector, and
   wherein the positive active material layer comprises a positive active material and a coating layer on the surface of the positive active material, and
   the coating layer comprises a coating layer composition comprising carbon nano particles, polyvinylpyrrolidone, and polyvinylidene fluoride.

2. The positive electrode of claim 1, wherein the carbon nano particles comprise carbon nanotubes and/or carbon nano fibers.

3. The positive electrode of claim 1, wherein the positive active material layer comprises
   the carbon nano particles in an amount of 0.1 to 10 wt %,
   the polyvinylpyrrolidone in an amount of 0.01 to 6 wt %,
   the polyvinylidene fluoride in an amount of 0.5 to 10 wt %, and
   the positive active material in a remaining balance amount.

4. The positive electrode of claim 1, wherein the polyvinylpyrrolidone and the polyvinylidene fluoride are comprised in a weight ratio of 1:1.5 to 1:9.

5. The positive electrode of claim 1, wherein the polyvinylpyrrolidone and the polyvinylidene fluoride are comprised in weight ratio of 1:3 to 1:8.

6. The positive electrode of claim 1, wherein the coating layer comprises the carbon nano particles each having a hydrophilic functional group on its surface.

7. The positive electrode of claim 6, wherein the hydrophilic functional group comprises a carbonyl group, a hydroxyl group, or a combination thereof.

8. The positive electrode of claim 7, wherein the mole ratio of the hydroxyl group to the carbonyl group is 0.5 to 1.

9. The positive electrode of claim 1, wherein an absorbance ratio at 1667 $cm^{-1}$ peak and 1397 $cm^{-1}$ peak of the positive active material layer is in a range of 0.5 to 1.

10. The positive electrode of claim 1, wherein the coating layer composition further comprises a carbon-based material.

11. The positive electrode of claim 10, wherein the carbon-based material comprises natural graphite, artificial graphite, carbon black, acetylene black, ketjen black, amorphous carbon powder, or a combination thereof.

12. The positive electrode of claim 10, wherein the carbon nano particles and the carbon-based material are comprised in a weight ratio of 1:9 to 9:1.

13. The positive electrode of claim 10, wherein the carbon-based material has a surface area in a range from 5 $m^2$/g to 2,000 $m^2$/g.

14. The positive electrode of claim 10, wherein the coating layer comprises the carbon nano particles and the carbon-based material as a single layer.

15. The positive electrode of claim 10, wherein the coating layer comprises
   a first layer comprising the carbon nano particles; and
   a second layer on the first layer comprising the carbon-based material, and
   wherein the second layer has protrusions and depressions.

16. The positive electrode of claim 1, wherein the positive electrode has density in a range from 3.0 g/cc to 4.0 glee.

17. A rechargeable lithium battery comprising:
   the positive electrode according to claim 1;
   a negative electrode; and
   an electrolyte solution impregnating the positive electrode and the negative electrode.

* * * * *